April 16, 1935.  R. T. NEWTON  1,997,780
CONTROL MEANS FOR ELECTRICALLY ACTUATED DEVICES
Filed Aug. 15, 1933   2 Sheets-Sheet 2
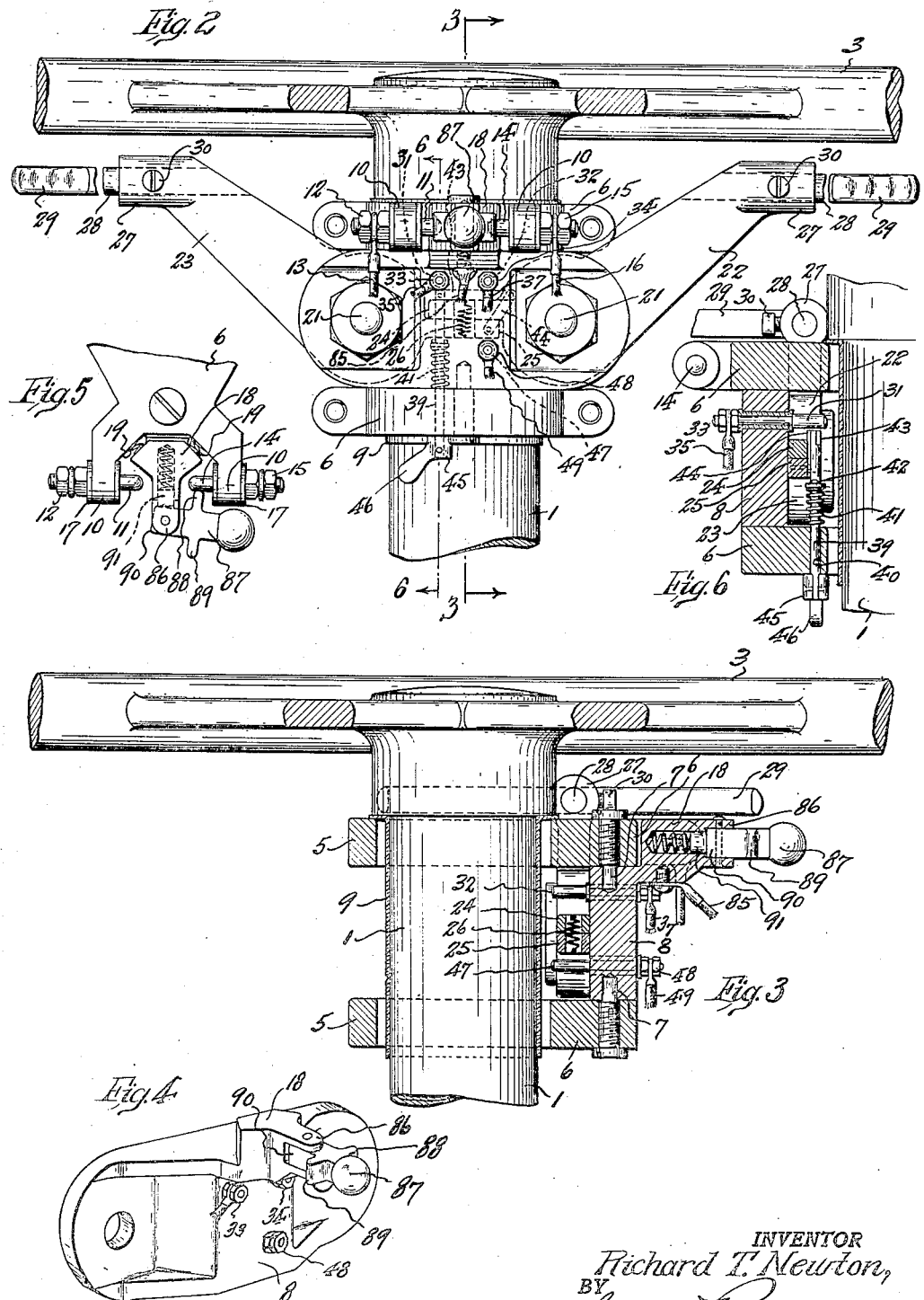
INVENTOR
Richard T. Newton,
BY George D. Richards
ATTORNEY Patented Apr. 16, 1935

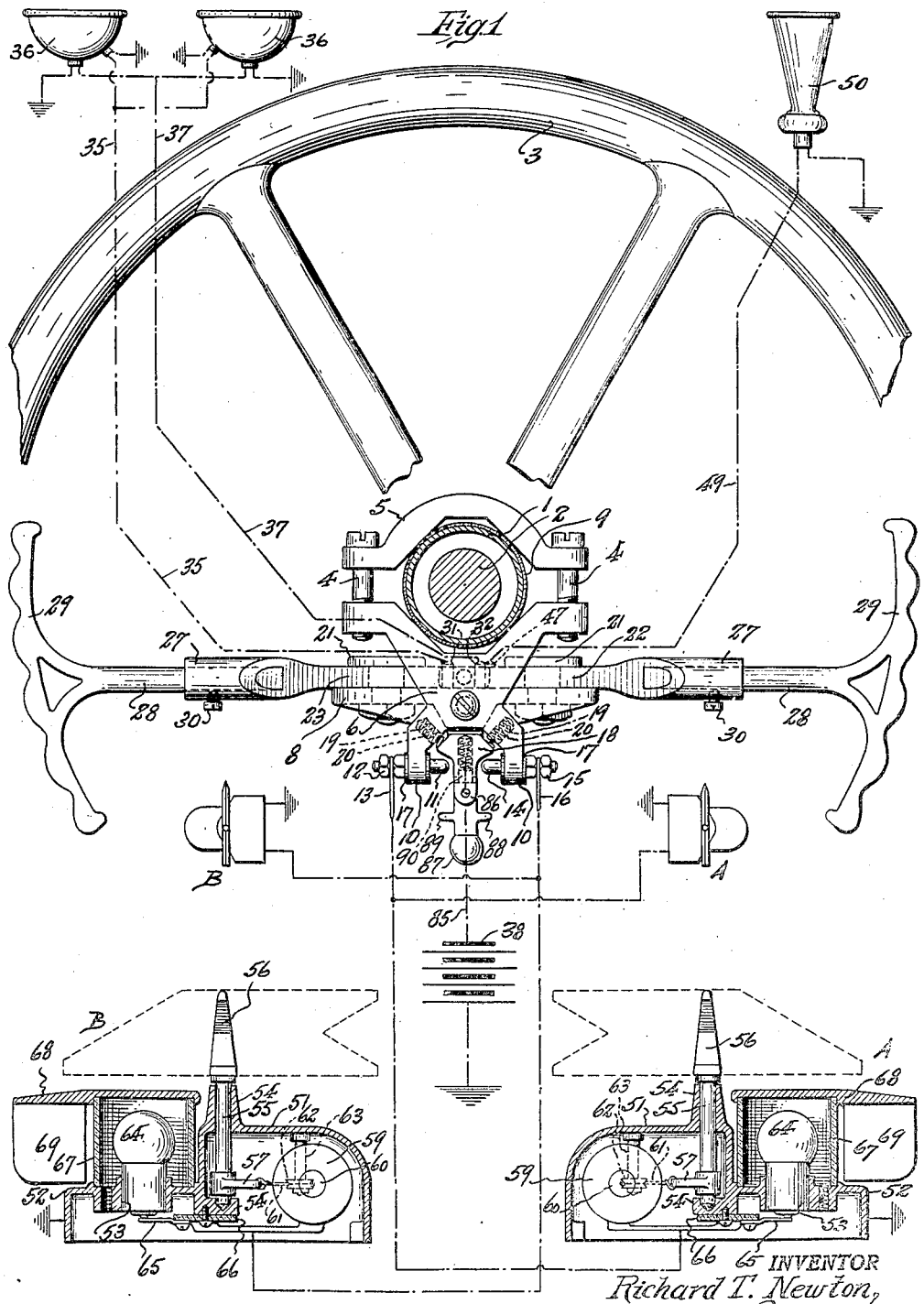

1,997,780

UNITED STATES PATENT OFFICE 1,997,780

CONTROL MEANS FOR ELECTRICALLY ACTUATED DEVICES

Richard T. Newton, Oyster Bay, N. Y.

Application August 15, 1933, Serial No. 685,165

10 Claims. (Cl. 200—59)

This invention relates, generally, to improvements in electrical circuit controlling means for electrically actuated devices of automobiles or any other type of dirigible mobile conveyance; and the invention has reference, more particularly, to a novel manipulatable means in association with the steering wheel of the conveyance adapted especially to control electrically actuated devices, such as directional signal devices, audible signal means, head-light dimming means, or other or like functional devices.

This invention has for its principal object to provide a novel circuit controlling means for an electrically actuated directional signal system, including suitably constructed and placed signal elements, wherein the manipulatable control means is of such novel form and mode of operation as to be capable of association with the steering post and wheel in such relation to the latter that any given operation of the signal control means may be accomplished by the driver with either hand, and without necessity for removal of the hands from the steering wheel with consequent risk of loss of driving control.

In another aspect of the invention, the novel manipulatable circuit control means for directional signal actuation is further constructed to provide additional means for selective control of horn and headlights, as well as of the directional signal elements.

Other objects of this invention, not at this time more particularly enumerated, will be understood from the following detailed description of the same.

Illustrative embodiments of the invention are shown in the accompanying drawings, in which:—

Fig. 1 is a schematic view, showing in plan manipulatable control or switch means as mounted on the steering post and in association with the steering wheel, the latter being broken away, and also showing rear end directional signal elements in vertical section and as electrically connected in circuit with said control or switch means, other elements such as forward end directional signal elements, headlights and signal horn being diagrammatically shown as connected in circuit with said control or switch means.

Fig. 2 is an elevational view of the novel control or switch means; Fig. 3 is a view in vertical section, taken on line 3—3 in Fig. 2; Fig. 4 is a detail perspective view of the horizontal rotative directional signal switch block; Fig. 5 is a fragmentary plan view showing the parking switch arm in an operative circuit closing position; Fig. 6 is a fragmentary vertical section, taken on line 6—6 in Fig. 2.

Similar characters of reference are employed in the above described views, to indicate corresponding parts.

In the said drawings, the reference character 1 indicates the steering column of an automobile in which is housed the steering shaft 2 upon the upper end of which is fixed the steering wheel 3. Affixed to said column 1, by means of the bolts 4 and clamp plates 5, are vertically spaced supporting blocks or stationary yokes 6. Disposed between said yokes 6, to turn horizontally in either direction about vertical trunnion elements 7 carried respectively by said yokes 6, is a directional signal switch block 8. Said clamp plates 5, yokes 6 and switch block 8 are electrically insulated from the steering column 1 by an interposed sleeve 9 of any suitable insulating material.

One of the yokes 6, preferably the upper, is provided at its rearward margin with a pair of laterally spaced rigid outwardly projecting arms 10. One of these arms, as shown the left-hand arm, supports a stationary inwardly and laterally projecting contact point 11, having at its outer end suitable binding post or circuit wire connection means 12 whereby the same may be electrically connected through a circuit wire 13 with one or more right-turn directional signal elements A (see Fig. 1). The other of said arms 10, as shown the right-hand arm, supports a stationary inwardly and laterally projecting contact point 14, also having at its outer end suitable binding post or circuit wire connection means 15 whereby the same may be electrically connected through a circuit wire 16 with one or more left-turn directional signal elements B (see Fig. 1). Said contact points 11 and 14 are respectively insulated, by insulation sleeves 17, from electrical contact with their respective supporting arms and thus also from the yokes 6 and switch block 8. The switch block 8 is provided with an outwardly and upwardly projecting contact-piece 18 (preferably integral therewith), the same normally lying in a neutral position intermediate said contact points 11 and 14 and normally out of contact therewith; this contact-piece 18 and in fact the switch-block 8 as a whole being yieldingly retained in such centered neutral position by opposed compression springs 19, which are seated in sockets 20 provided in the respective arms 10 so that their free ends bear tensionally and with counterbalancing pressure respectively against opposite sides of said contact-piece 18.

Pivotally connected, by fulcrum bolts 21, respective to the lateral end portions of said switch block 8, so as to overlie the inner face thereof, and so as to turn about their fulcrums in vertical plane are right hand and left hand levers 22 and 23. The right hand lever 22 is provided, at the inner side of its fulcrum, with a horizontal tongue or lug 24, and the left hand lever 23 is also provided, at the inner side of its fulcrum, with a similar horizontal tongue or lug 25. Said tongues mutually overlap each other, being yieldingly maintained in parallel face to face contact by an interconnecting spring 26 (see Figs. 2 and 3), thereby determining the normal or neutral positions of said levers. At the outer end of each of said levers 22 and 23 is a tubular socket 27 in which are slidably adjustable the shanks 28 of arcuate finger grips 29; said shanks being fixed in desired adjusted positions by set screws 30. By this arrangement said arcuate finger grips are rendered extensible, so that the same may be moved and disposed relative to the rim of the steering wheel 3 according to the diameter of the latter in any given case. It will be noticed that said finger grips 29 are of arcuate form so that the same may substantially parallel the steering wheel rim, but the same are preferably somewhat inwardly offset relative to the outer periphery of the latter, and are spaced beneath so that the fingers of the hands engaging the steering wheel may engage said grips for imparting either up or down or sideways movements to said levers.

Carried by said switch block 8, but electrically insulated therefrom, and arranged to project from the inner face thereof above the mutually cooperative tongues or lugs 24—25 of the levers 22—23, are contact pins 31 and 32, the same being respectively provided at their fixed ends with suitable binding posts or circuit wire connection means 33 and 34. One of these contact pins, as 31, is connected through circuit wires 35 with one pole of the dimmer filaments of the automobile headlights 36, and the remaining contact pin 32 is connected through circuit wires 37 with the bright filaments of said headlights, the opposite poles of said respective dimmer and bright filaments being grounded for return to the grounded side of a source of electrical energy, as, for example, storage battery 38. Means are provided adapted for actuation by suitable movements of said levers 22 or 23, for cooperation with said contact pins 31—32 to deenergize the dimmer filaments and simultaneously energize the bright filaments of the headlights 36 at will; this means being also arranged to operate as an independent shut-off switch for discontinuing service of the headlights. Illustrative of one form of such actuatable means there is provided a vertically movable rod 39, slidable in a way 40 provided in the lower yoke 6. Said rod 39 is yieldably thrust upward by a spring 41 which is footed upon the lower yoke 6 with its upper end bearing on a washer and cross pin stop 42 with which the rod is provided. Pivotally connected with the upper end of said rod is a contact bar 43 which extends transversely beneath the contact pins 31—32. The free end of this contact bar 43 is interconnected by a link 44 with the tongue or lug 25 of the left hand lever 23. The lower end of the rod 39 projects downwardly beneath the lower yoke 6 and pivoted to this end is retractor cam and stop 45 having a finger piece 46 for manipulating the same. The use and operation of these devices will be subsequently explained.

Also carried by the switch block 8, but electrically insulated therefrom, and disposed to project from the inner face thereof beneath the mutually cooperative tongues or lugs 24—25 of the levers 22—23, is a contact pin 47, the same being provided at its fixed end with a suitable binding post or circuit wire connection means 48. This contact pin is connected through a circuit wire 49 with one pole of an electric signal or alarm horn 50, the other pole of which is suitably grounded for return to the grounded side of the battery 38.

The directional signal elements A and B each comprise, in one specific form thereof, a suitable casing or housing 51, capable of being mounted on the conveyance in desired locations, as for example in connection with automobiles, one being located upon the right hand rear fender, one upon the left hand rear fender, and if desired one each respectively upon the right and left hand front fenders, or upon any other suitably exposed part of the automobile body structure. Said housing 51 is provided at one side with an exteriorly projecting lamp supporting extension 52 having a lamp base receiving socket 53. Formed in connection with said housing 51 are vertically aligned bearings 54 in which is journaled a vertical shaft 55, the upper end of which projects exteriorly from said housing. Fixed upon the exterior end of said shaft 55 is a visible signal device 56, preferably resembling an arrow. Affixed to the lower end of the shaft 55 within the housing is a lever arm 57 to which is attached a pull spring (not shown) serving to yieldingly hold the shaft turned to dispose the arrow signal device 56 in a neutral position parallel to the longitudinal axis of the automobile upon which the signal element is mounted. Suitably secured within the housing interior is a solenoid 59, to the armature 60 of which is coupled a pull-cable 61. This pull cable runs over a guide pulley 62, that is supported by a stub shaft 63 within the housing, and thence passes to said lever arm 57, to which it is attached. Mounted in the lamp socket 53 is an incandescent lamp 64, one pole of which engages a fixed contact brush 65 mounted upon but insulated from the housing by the insulator plate 66. The other pole of said lamp is grounded to the housing for return to the grounded side of the battery 38. A suitable lamp globe 67 is supported on the extension around the lamp, in connection with the upper end of which is secured a top cap 68 having dependent visor or light shield vanes 69 adapted to render the light beams from the lamp more easily visible, especially in full or partial daylight. The circuit wires 13 or 16, as the case may be, leading to the signal elements, are branched, so that one branch is connected to one pole of the solenoid 59, the other pole of the latter being grounded, and the other branch is connected to the contact brush 65 which supplies current to the lamp 64.

A circuit wire 85 is connected between the positive pole of the battery 38 and the switch member 8. The functioning of the control switch mechanism for selectively operating the directional signal elements is as follows:

Assuming the driver of automobile, equipped with the novel directional signal system, desires to indicate that he is about to make a right hand turn; in such case the finger grips 29 are engaged by the fingers of the hand or hands grasping the steering wheel 3, so that without moving the wheel or by but a slight movement of the wheel from left to right, which is insufficient to appreciably immediately alter the straight ahead course of the automobile, tends to swing the levers 22—23 laterally in clockwise direction. Such movement is transmitted to the switch block 8, whereby the same is shifted about the trunnions 7 in such clockwise direction. This movement of the switch block 8 carries its contact-piece 18 into engagement with the contact point 11, thereby completing an electric circuit through the right hand signal elements A, so that current flowing from the battery 38 through wire 85 and switch block 8 is delivered through contact point 11 and circuit wires 13 to the solenoids and lamps of said right hand signal elements A; the circuit being completed back to battery 38 through ground. The completion of the circuit energizes the solenoid, so that the signal arrow 56 is turned to a transverse position pointing in a direction toward which the driver is to turn; and at the same time the signal lamp 64 is illuminated. Approaching and following automobiles may observe such indicating positions of the signal arrows, and thus be warned of the driver's intention to make a right turn. It will be obvious that the indication of an intention to make a left hand turn is made in a similar manner, by swinging the levers 22—23 in anti-clockwise direction, whereby the switch block 8 is turned to engage the contact point 14, thus serving operating current to the left turn signal elements B through the circuit wires 16. It will be understood, that the signal elements A and B may be omitted at the front of the automobile, if so desired, and only employed at the rear of the latter.

It is convenient to have parking lights at both the right and left hand sides of the automobile, whereby the same may be selectively employed accordingly as one or the other of said sides is outwardly faced toward the road at the side of which the automobile is to be left standing or parked. An additional feature of this invention is provision of means whereby the lamps of the directional signal elements may furnish such parking lights subject to selective use. To this end a manual auxiliary switch device is furnished for selective cooperation with the contact points 11 and 14. This auxiliary switch device, comprises a bifurcated pivotal support 86 extending outwardly from the switch block 8, in connection with which is pivotally mounted, for lateral swinging movement in either direction, a switch arm 87 having oppositely and laterally directed contact ears 88 and 89, the inner end of said switch arm is provided with a square faced projection 90 against which yieldingly bears a spring pressed plunger 91, thereby holding the switch arm in neutral inactive position as shown in Fig. 1. Should it be desired to employ the left turn directional signal lamps B as parking lights, the switch arm 87 is swung to the right, thereby bringing its contact ear 88 into circuit closing engagement with the contact point 14 (see Fig. 5). The switch arm is held in such operative position by the pressure of the plunger 91 against the engaged side of the projection 90. It will be obvious that should it be desired to utilize the lamps of the right turn signal elements as parking lights, the switch arm 87 is swung to the left into engagement with the contact point 11.

In the operation of the control device with respect to controlling the headlights of the automobile, the means provided are, in the illustrative form thereof shown in the drawings, adapted to serve also as a manual switch for putting the headlights in and out of service. When the retractor cam 45 occupies the position shown in Figs. 2 and 6, the rod 39 is pulled downward and so maintained whereby the contact bar 43 is removed from engagement with the contact pin 31, thus interrupting the electrical circuit serving the headlights. To put the headlights into service, said retractor cam is turned to the right, thus releasing the down pull thereof upon the rod 39, so that the spring 41 may urge upwardly said rod to carry the adjacent end of the contact bar 43 into circuit closing engagement with the contact pin 31, whereupon current from the battery 38 supplied to switch block 8 and associated parts will pass through said rod 39 and contact bar 43 to the contact pin 31, thence flowing through circuit wires 35 to the dimmer filaments of the headlights, which are grounded for return to battery 38. Should the driver desire to change temporarily the headlight illumination from "dim" to "bright", either one or the other of the levers 22—23 are pressed downward by the fingers of the hand or hands grasping the steering wheel. Such downward movements of the levers 22—23 produces an upswinging movement of the lugs 24—25. Upswing of the lug 25 is transmitted through link 44 to contact bar 43, whereby its free end is upswung against contact pin 32, which, serving as a fulcrum, causes the opposite end of the contact bar 43 to swing downward so as to disengage the contact pin 31, thus interrupting the "dim" circuit but closing the "bright" circuit, so that current flows through switch block 8 and associated parts to rod 39 and contact bar 43 into contact pin 32, and thence through circuit wires 37 to bright filaments of the headlights. When the levers 22—23 are released, the parts resume the positions calculated to close the dim circuit. It will be understood that the specific arrangement above described is designed to permit driving with dim headlights as normal condition and bright headlights reserved for emergency or intermittent use. It will be obvious that the reverse of this arrangement may be attained by reversing the connection of the circuit wires 35 and 37 with respect to the contact pins 31 and 32.

In the use of the control device for operating the audible signal or horn 50, the levers 22—23 or either of them are pressed upwardly by the fingers of the hand or hands grasping the steering wheel, thus swinging downward the lugs 24—25, so as to carry the lug 25 into engagement with the contact pin 47. Under such condition, current from the battery 38 flows through switch block, levers and lugs into said contact pin 47, and thence through circuit wire 49 to the horn 50, which is grounded for return to battery 38. The horn will continue to sound until upswinging pressure upon the levers 22—23 is released.

It will be understood that in its simplest form, and as restricted for use mainly in controlling the directional signal elements, the use of the headlight and horn controls, or either of them, may be omitted.

While it is preferable to employ the independent right and left turn signal elements to be respectively mounted at right and left hand sides of the conveyance, it will be understood that in its broader aspects, I do not desire to limit myself to such individual signal elements, since a single signal device including in one instrumentality right and left signal means may be employed if desired, such signal means being respectively connected with and served by the contact points 11 and 14.

I am aware that various changes could be made in the above described constructions, and that widely different embodiments of this invention could be made without departing from the scope thereof; it is therefore intended that all matter contained in the above description and shown in the accompanying drawings shall be interpreted as illustrative and not in a limiting sense.

I claim:—

1. Electric circuit control means adapted to be mounted on the steering column of a conveyance adjacent to the steering wheel thereof and adapted for manipulation by the fingers of the hand or hands grasping the latter, said control means comprising a stationary supporting means, a switch block mounted in connection therewith for lateral movements, lever means extending from said switch block in opposite directions and terminating in finger grips spaced relative to the rim of the steering wheel, laterally spaced stationary contact points supported by but insulated from said supporting means, a contact piece carried by said switch block normally disposed between said contact points but selectively movable into engagement therewith upon movement of said switch block, by said lever means, said contact points being adapted to serve right and left turn signal elements, to which they are respectively electrically connected, and spring means for returning said contact-piece and said lever means to normal neutral positions when released after any given actuation thereof.

2. Electric circuit control means adapted to be mounted on the steering column of a conveyance adjacent to the steering wheel thereof and adapted to be manipulated by the fingers of the hand or hands grasping the latter, said control means comprising a pair of vertically spaced yokes clamped to said steering column and electrically insulated therefrom, a switch block pivotally supported by and between said yokes, one of said yokes having a pair of outwardly projecting laterally spaced arms, said switch block having a contact portion normally disposed between said arms, spring means for yieldably centering said switch block with its contact portion so disposed, lever means extending outwardly from said switch block in opposite directions and terminating in finger grips spaced relative to the rim of said steering wheel, contact points respectively mounted in but insulated from said arms so as to be selectively engageable by said contact portion of the switch block upon proper pivotal movement of the latter by said lever means, said contact points being adapted to serve right and left turn signal elements to which they are respectively electrically connected.

3. In control means as defined in claim 1, a manual auxiliary switch arm pivotally connected with said switch block, said switch arm being selectively movable into circuit closing engagement with either of said contact points independently of movement of said switch block, and means to yieldably hold said switch arm in neutral inactive position.

4. In control means as defined in claim 2, a manual auxiliary switch arm pivotally connected with the contact portion of said switch block, said switch arm being selectively movable into circuit closing engagement with either of said contact points independently of movement of said switch block, and means to selectively and yieldingly hold said switch arm in either neutral inactive or active relation to said contact points.

5. Electric circuit control means adapted to be mounted on the steering column of a conveyance adjacent to the steering wheel thereof and adapted for manipulation by the fingers of the hand or hands grasping the latter, said control means comprising a stationary supporting means, a switch block mounted in connection therewith for lateral movements, lever means pivoted for vertical movements to said switch block and extending outwardly therefrom in opposite directions, said lever means terminating at their outer ends in finger grips spaced relative to the rim of said steering wheel, said lever means terminating at their inner ends in mutually overlapping lugs, laterally spaced stationary contact points supported by but insulated from said supporting means, a contact piece carried by said switch block normally disposed between said contact points but selectively movable into engagement therewith upon movement of said switch block, and circuit make and break means actuatable by vertical movements of said lever means and their lugs.

6. Electric circuit control means adapted to be mounted on the steering column of a conveyance adjacent to the steering wheel thereof and adapted to be manipulated by the fingers of the hand or hands grasping the latter, said control means comprising a pair of vertically spaced yokes clamped to said steering column but electrically insulated therefrom, a switch block pivotally supported by and between said yokes for lateral movements, one of said yokes having a pair of outwardly projecting laterally spaced arms, said switch block having a contact portion normally disposed between said arms, spring means for yieldably centering said switch block with its contact portion so disposed, lever means pivoted for vertical movements to said switch block and extending outwardly therefrom in opposite directions, said lever means terminating at their outer ends in finger grips spaced relative to the rim of said steering wheel, said lever means terminating at their inner ends in mutually overlapping lugs, spring means to yieldably hold said lever means and lugs in neutral normal initial positions, contact points respectively mounted in but insulated from said arms so as to be selectively engageable by said contact portion of the switch block upon lateral movement of the latter, and circuit make and break means actuatable by vertical movements of said lever means and their lugs.

7. Electric circuit control means adapted to be mounted on the steering column of a conveyance adjacent to the steering wheel thereof and adapted to be manipulated by the fingers of the hand or hands grasping the latter, said control means comprising a pair of vertically spaced yokes clamped to said steering column but electrically insulated therefrom, a switch block pivotally supported by and between said yokes for lateral movements, one of said yokes having a pair of outwardly projecting laterally spaced arms, said switch block having a contact portion normally disposed between said arms, spring means for yieldably centering said switch block with its contact portion so disposed, lever means pivoted for vertical movements to said switch block and extending outwardly therefrom in opposite directions, said lever means terminating at their outer ends in finger grips spaced relative to the rim of said steering wheel, said lever means terminating at their inner ends in mutually overlapping lugs, spring means to yieldably hold said lever means and lugs in neutral normal initial positions, contact points respectively mounted in but insulated from said arms so as to be selectively engageable by said contact portion of the switch block upon lateral movement of the latter, a contact pin carried by but insulated from said switch block, a second contact pin also carried by but insulated from said switch block, contact means movable by said lugs of said lever means when the latter are vertically moved, said contact means being electrically connected with said switch block and associated parts, and said contact means cooperating with said contact pins.

8. Control means as defined in claim 7, wherein said contact means is manipulatable independently of said lever means and their lugs so as to serve as a headlight shut-off switch.

9. In an electric circuit control means, a control device adapted to be mounted on the steering column of a conveyance adjacent to the steering wheel thereof and adapted to be manipulated by the fingers of the hand or hands grasping the latter, said control device comprising a supporting means, a switch block mounted in connection therewith for lateral movements, circuit make and break devices selectively actuated by lateral movements of said switch block, lever means pivoted for vertical movements to said switch block and extending outwardly therefrom in opposite directions, said lever means terminating at their outer ends in finger grips spaced relative to the rim of said steering wheel, a plurality of circuit make and break means selectively actuated by vertical movements of said lever means.

10. Electric circuit control means adapted to be mounted on the steering column of an automobile adjacent to the steering wheel thereof, comprising a stationary supporting means a switch block mounted in connection therewith for lateral movements, lever means pivoted upon said switch block for up and down vertical movements while being capable of right and left lateral swinging movements with said switch block, insulated circuit terminals carried by said supporting means selectively engageable by said switch block when moved by given lateral swinging movements of said lever means, a circuit closing means controlled by up-swinging movement of said lever means, another circuit closing means controlled by down-swinging movement of said lever means, and means to automatically return said lever means from any given actuated position to normal neutral position.

RICHARD T. NEWTON.